(12) United States Patent
Persson et al.

(10) Patent No.: US 10,350,871 B2
(45) Date of Patent: Jul. 16, 2019

(54) METHOD FOR A LAMINATED PACKAGING MATERIAL

(71) Applicant: TETRA LAVAL HOLDINGS & FINANCE S.A., Pully (CH)

(72) Inventors: Fredrik Persson, Lomma (SE); Per Engvall, Södra Sandby (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/519,423

(22) PCT Filed: Oct. 16, 2015

(86) PCT No.: PCT/EP2015/074007
§ 371 (c)(1),
(2) Date: Apr. 14, 2017

(87) PCT Pub. No.: WO2016/059212
PCT Pub. Date: Apr. 21, 2016

(65) Prior Publication Data
US 2017/0225444 A1    Aug. 10, 2017

(30) Foreign Application Priority Data

Oct. 17, 2014   (EP) .................................... 14189354

(51) Int. Cl.
| | |
|---|---|
| *B32B 15/08* | (2006.01) |
| *B32B 37/15* | (2006.01) |
| *B32B 5/02* | (2006.01) |
| *B32B 5/18* | (2006.01) |
| *B32B 7/12* | (2006.01) |
| *B32B 15/20* | (2006.01) |
| *B32B 27/06* | (2006.01) |
| *B32B 27/08* | (2006.01) |
| *B32B 27/10* | (2006.01) |
| *B32B 27/12* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 37/00* | (2006.01) |
| *B65D 5/56* | (2006.01) |
| *B65D 85/80* | (2006.01) |
| *B32B 37/02* | (2006.01) |

(52) U.S. Cl.
CPC ............ *B32B 37/153* (2013.01); *B32B 5/022* (2013.01); *B32B 5/18* (2013.01); *B32B 7/12* (2013.01); *B32B 15/08* (2013.01); *B32B 15/20* (2013.01); *B32B 27/065* (2013.01); *B32B 27/08* (2013.01); *B32B 27/10* (2013.01); *B32B 27/12* (2013.01); *B32B 27/306* (2013.01); *B32B 27/32* (2013.01); *B32B 27/327* (2013.01); *B32B 27/34* (2013.01); *B32B 27/36* (2013.01); *B32B 37/0053* (2013.01); *B65D 5/563* (2013.01); *B65D 85/80* (2013.01); *B32B 37/02* (2013.01); *B32B 2255/10* (2013.01); *B32B 2255/205* (2013.01); *B32B 2255/26* (2013.01); *B32B 2307/31* (2013.01); *B32B 2307/50* (2013.01); *B32B 2307/7244* (2013.01); *B32B 2309/105* (2013.01); *B32B 2439/70* (2013.01)

(58) Field of Classification Search
CPC ....... B32B 15/08; B32B 37/153; B32B 5/022; B32B 5/18; B32B 27/08; B32B 15/20; B32B 27/065; B32B 27/10; B32B 27/12; B32B 27/306; B32B 27/32; B32B 27/327; B32B 27/34; B32B 27/36; B32B 37/0053; B32B 2307/7244; B32B 2309/105; B32B 2439/70; B32B 2255/10; B32B 2255/025; B32B 2255/26; B32B 2307/31; B32B 2307/50; B32B 37/02; B65D 5/563; B65D 85/80

See application file for complete search history.

(56) References Cited

U.S. PATENT DOCUMENTS

| | | | |
|---|---|---|---|
| 4,941,935 A | 7/1990 | Gregory | |
| 6,036,803 A * | 3/2000 | Lasson et al. .......... | B32B 37/02 156/216 |
| 6,858,106 B1 | 2/2005 | Ikenoya | |
| 2003/0031859 A1* | 2/2003 | Sinsel et al. ........... | B05D 1/265 428/332 |
| 2013/0084423 A1* | 4/2013 | Postoaca et al. ......... | B32B 3/20 428/138 |

FOREIGN PATENT DOCUMENTS

| | | |
|---|---|---|
| CN | 102869509 A | 1/2013 |
| EP | 0 316 109 A1 | 5/1989 |
| EP | 1 285 744 A1 | 2/2003 |
| WO | WO 96/17725 A1 | 6/1996 |

OTHER PUBLICATIONS

International Search Report (PCT/ISA/210) dated Jan. 29, 2016, by the European Patent Office as the International Searching Authority for International Application No. PCT/EP2015/074007.

(Continued)

*Primary Examiner* — Nathan M Nutter
(74) *Attorney, Agent, or Firm* — Buchanan Ingersoll & Rooney PC (57) ABSTRACT

A method for providing a film laminate comprising a substrate and a polymer film, and suitable for forming a part of a laminated packaging material is provided. The method comprises forwarding a web of the substrate to pass through a lamination nip. The method further comprises casting the polymer film by applying a molten polymer material onto a cooling roller to at least partially solidify the molten polymer material to form the polymer film. Furthermore, the method comprises directly forwarding the polymer film to pass through the lamination nip, thereby laminating the polymer film onto the web of the substrate.

9 Claims, 3 Drawing Sheets

(56) References Cited

OTHER PUBLICATIONS

Written Opinion (PCT/ISA/237) dated Jan. 29, 2016, by the European Patent Office as the International Searching Authority for International Application No. PCT/EP2015/074007.
Extended European Search Report dated Apr. 2, 2015, by the European Patent Office in counterpart European Application No. 14189354.5.

* cited by examiner

METHOD FOR A LAMINATED PACKAGING MATERIAL

TECHNICAL FIELD

The present invention relates method for a laminated packaging material. More particularly the present invention relates to a method for providing a film laminate which may form part of a laminated packaging material.

BACKGROUND

Packaging material, e.g., packaging material having a core layer of cellulose such as paper, paperboard, cardboard, etc., is normally laminated into a multi-layer structure for providing superior properties of the final package. In liquid food packaging it is e.g. desired to provide a robust package preventing leakage, and in some cases it may also be desired to prevent the enclosed product to be exposed to oxygen. These and other requirements of the final package have pushed the development of packaging material in the form of multi-layer laminates, wherein a core layer of e.g. carton is covered by plastic layers on both sides.

Figure 1:
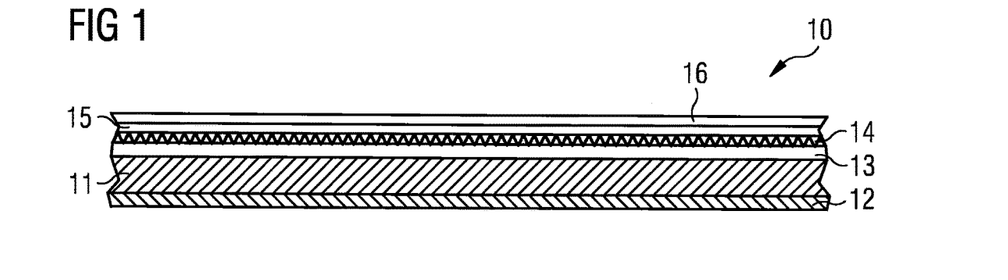
FIG. 1 is a cross-sectional view of a prior art layer structure of a packaging laminate, as well as of a laminated packaging material according to the invention, having improved adhesion between adjacent layers of such a prior art layer structure.

One well known layer structure of a packaging laminate 10 is shown in FIG. 1, according to which a core layer 11 of carton (hereafter also referred to as 'carton layer 11') is covered by a plastic layer 12 of low-density polyethylene (LDPE) for forming an outside of the packaging laminate 10, i.e. a side of a final package that is not in contact with an enclosed product, usually a liquid food product, such as milk, dairy, beverage, juices, puree, etc. An inner side of the carton layer 11 is covered with a similar layer 13 of LDPE (hereafter referred to as 'LDPE bonding layer 13') which is used to laminate, i.e. bind together, a thin foil of aluminium 14 (hereafter also referred to as 'aluminium foil 14') to the carton layer 11. In order to avoid contact between the enclosed product and the aluminium foil 14 the aluminium foil 14 is covered by a polymer layer, normally first an adhesive polymer layer 15 (hereafter also referred to as 'layer 15' or 'inner layer 15'). The layer 15 is in turn covered by an innermost layer 16 of LDPE or a blend of LDPE with an linear low density polyethylene (LLDPE), such as an LLDPE polymerised in the presence of a constrained geometry catalyst, such as a metallocene-catalyst (m-LLDPE) (hereafter also referred to as 'layer 16' or 'inner layer 16') which is to be in direct contact with the enclosed product in a packaging container.

The above-mentioned example of a packaging laminate has proven to be generally very well functioning for enclosing liquid food products in an aseptic manner.

However, the aluminium foil 14, which forms an oxygen barrier is normally very thin, such as in the range from about 5 to about 12 μm, such as from 5 to 10 μm. For this reason, the aluminium foil 14 is rather delicate and may cause some concerns when the LDPE bonding layer 13 and the inner layers 15 and 16 are being laminated to the aluminium foil. Some of the concerns arise from bad adhesion between the adjacent layers, uneven application of the LDPE bonding layer 13, or of the inner layers 15 and 16, and defects in the laminate layer, such as for example very small holes, so-called pin-holes. For example, there may be zones within the layered laminate that have less reliable adhesion, such as around crease lines or folding lines, that have been impressed into the carton layer 11, before lamination. Furthermore, there may be breakage of the aluminium foil 14 in the areas near pre-cut holes of the core layer, i.e. the carton layer, due to tensions or wrinkles in the aluminium foil, formed during lamination. The breakages in the aluminium foil may occur first during subsequent handling in the filling and packaging machines or during distribution and transport, when the pre-stressed aluminium foil material is subject to further stress. Such concerns may thus be more pronounced when the carton layer 11 has deviations from a flat, evenly thick, layer, such as pre-cut holes, slits or attenuations, i.e. features that are provided in the carton layer 11 before the lamination operations, and further at high web speeds in the lamination and coating operations.

The application of the polymer layers in the laminate is conventionally done by extrusion coating or extrusion lamination of molten thermoplastic polymer. In the extrusion lamination operation, the laminate bonding layer 13 is extruded from a die in the form of a molten curtain which is applied between the paperboard web and the web of aluminium foil 14, while they are entering the nip between a cooling roller and a press roller. Similarly, in an extrusion coating operation, the innermost layer 16, together with the adjacent inner layer 15, is extruded from a die in the form of a molten curtain which is applied onto the laminated web of carton 11 and aluminium foil 14, while they are entering another nip between a cooling roller and a press roller. The temperature of the molten polymer curtain is rather high when applied to the aluminium foil 14, such as in the range of 200-340° C., and when the molten film solidifies to form the laminate layer 13, its density changes by at least 10%. Since the aluminium foil is to the major part supported by the more dimensionally stable web of carton, this does not normally cause any concern.

In the areas of any pre-cut holes of the paperweb, however, the aluminium foil is unsupported. Since the molten web is hot at application to the unsupported aluminium foil 14 in these areas, there may be tensions or wrinkles in the aluminium foil 14 due to polymer shrinkage as the polymer cools down and solidifies around the edges of the pre-cut hole. This may lead to unwanted effects, such as inclusion of air and tensions and wrinkles in the thin and sensitive aluminium foil layer in the final laminate, during the high speed process of melt extrusion laminating, or extrusion coating, of the aluminium foil with the adjacent layers.

Thus, in view of the above there is still a need for an improved and more robust and stable method for manufacturing of a laminated packaging material, which method allows for providing laminated packaging materials with good and reliable adhesion between thin and sensitive laminated material layers, also at high lamination and web forwarding speeds, and also in difficult areas of the laminated material. There is particularly a need, around the paperboard hole regions of a paperboard, to avoid and minimise the formation of wrinkles, tensions or air entrapments. In particular, the membrane, i.e. the laminated aluminium foil and polymer layers within the pre-cut hole region of the paperboard, should have good adhesion between the layers throughout the area of the membrane or hole, and the membrane should have as few defects as possible, i.e. tensions or wrinkles in the aluminium foil, air entrapments, breakages or pin-holes of layers, uneven thickness of the polymer layers, or other related defects.

SUMMARY

An object of the present invention is to provide a method overcoming the above-mentioned disadvantages.

In an embodiment of the present invention, a method is provided, which involves pre-forming the package inside polymer layer as a polymer film, and subsequently adhering the polymer film to a thin substrate, such as a barrier film, barrier-coated film or a metal foil, after the polymer film has been allowed to cool down, at least partly.

According to a first aspect, a method for providing a film laminate that includes a substrate and a polymer film, and that is suitable for forming a part of a laminated packaging material, is provided. The method involves continuously forwarding a web of the substrate to pass through a lamination nip. The method further includes casting the polymer film by applying a molten polymer material onto a cooling roller to at least partially solidify the molten polymer material to form the polymer film, in a first step. Furthermore, the method includes subsequently but directly forwarding the polymer film to pass through the lamination nip, thereby laminating the polymer film onto the web of the substrate to provide the film laminate. The lamination nip is defined by two rollers rotating towards and pressing on each other, normally a press roller and an anvil roller.

According to an embodiment, the step of casting the polymer film is performed by an extrusion casting process. Solid polymer raw material, normally in the form of granules, is heated, molten and worked in a blending apparatus and forwarded with an extruder screw to an extrusion die, which is shaping the molten polymer into a molten film, or curtain, which melts down onto a moving surface, normally a rotating cooling roller, while the film or curtain solidifies and forms a more or less solidified and cooled polymer film.

According to an embodiment, the substrate to which the cast polymer film is laminated comprises a metal foil, more preferably an aluminium foil. According to another embodiment, the substrate comprises a metallised polymer film. The substrate may alternatively be a polymer barrier film with inherent barrier properties, or a polymer film which has been coated with a barrier coating on one or both sides. Suitable barrier coatings are for example applied by means of vapour deposition coating or by solution or dispersion coating of an aqueous polymer composition and subsequent drying.

According to a further embodiment, the method may comprise a step of heating the web of the substrate to enable lamination with the polymer film. According to a preferred such embodiment, the step of heating the web of the substrate may be performed by increasing the temperature at the lamination nip, in particular in the nip itself, by one of the nip rollers being heated.

According to an embodiment, the step of applying the molten polymer film comprises maintaining contact between the molten polymer film and the cooling roller for a predefined time period to form the polymer film. The polymer film is thus at least partially solidified prior to laminating the thus formed polymer film to the web of the substrate in the lamination nip. Different thermoplastic polymers may require different cooling times in order to solidify to a desired extent, and consequently require longer or shorter contact times with the cooling roller.

According to air embodiment, the anvil roller of the lamination nip is a cooling roller, and according to a further embodiment the anvil roller of the lamination nip is the cooling roller of the film extrusion casting unit.

According to a further embodiment, the step of applying the molten polymer film comprises maintaining contact between the molten polymer film and the cooling roller of the extrusion casting unit until the temperature of the molten polymer material has at least partially decreased to its melting point or lower, in order to form the polymer film, prior to laminating the polymer film to the web of the substrate. According to a more specific embodiment, the molten polymer film should be allowed to cool down to its freezing point, or solidifying point, or lower, if the polymer to be solidified has such a temperature point which is different from its melting point. In the case of lower density polyethylene polymers, the melting point is normally about 90 degrees Celsius. The freezing point may be slightly different from the melting point in the case of polyethylenes, but cooling to below 90 degrees should normally mean that the polyethylene is solidifying.

According to a second aspect, a film laminate manufactured according to a method described in the first aspect, is provided.

According to an embodiment, the molten polymer material comprises a polyolefin homo- or copolymer. According to one embodiment, the molten polymer material comprises one or more polymers selected from the group consisting of an adhesive polymer comprising mainly ethylene monomer units, a low-density polyethylene (LDPE), a linear low density polyethylene (LLDPE) and a single site catalyst metallocene polyethylene (mLLDPE). According to another embodiment, the molten polymer material comprises a polypropylene homo- or copolymer.

According to a further embodiment, the polymer film comprises a multi-layer structure.

According to further embodiments, the substrate comprises a metal foil, a polymer film provided with a barrier coating, or a polymer film having barrier properties. According to one preferred embodiment, the film laminate comprises a metal foil which has a thickness of 5 to 10 micrometers. According to a further embodiment, the substrate comprises one or more of aluminium, ethylene vinyl alcohol copolymer, polyamide and barrier-coated polymer film, such as a polyester, polyamide or polyolefin film, such as a metallised polymer substrate film.

According to a third aspect, a method of providing a laminated packaging material that includes a bulk layer, is provided. With the term "bulk layer", layers substantially contributing to the mechanical properties of the laminated packaging material, are intended. Such properties are for example bending stiffness, compression strength, dimensional stability, grip stability, etc. Another similar term is "core layer". Conventionally, the bulk layer has been made of materials such as paper, paperboard, carton, or other cellulose-based material. Also, other bulk layers are conceivable within the scope of the present disclosure, such as foamed layers of polymer or non-woven fibre layers, and the like. The method includes providing a film laminate according to the method described in the first aspect. Further, the method includes forwarding a web of the film laminate and a web of the bulk layer to a lamination nip. Furthermore, the method includes joining the web of the bulk layer to the web of the film laminate in the lamination nip by extruding a molten film of a thermoplastic polymer and laminating the molten film between said webs in the lamination nip, thereby forming the laminated packaging material.

The method may further comprise the step of providing a further layer of thermoplastic polymer to the bulk layer such that the thermoplastic polymer layer covers one side of the bulk layer, and the opposite side of the bulk layer is covered by the film laminate. A packaging container produced from the laminated packaging material would accordingly have the film laminate side towards the interior of the package, and the further layer of thermoplastic polymer will be the outside surface of the container. Accordingly, this layer needs to be suitable for coating of a printed decor without deteriorating the appearance and performance thereof, and for handling of packages in filling machines/packaging machines and distribution. Regarding the latter, the surface properties such as friction, glossiness and durability to abrasion and liquids are important. The lamination of the laminate film of the invention into a pack mat is advantageous because it provides a more robust lamination operation in which the thin barrier film or foil web substrate is less vulnerable and prone to wrinkling, cracking and the like when joined to a bulk layer. It thus provides laminated materials with improved quality and less defects due to the sensitive barrier layer being exposed, as the lamination speeds are constantly increased in order to produce the laminated materials at lower cost and more efficiently. In particular, the quality improvement is visible in connection to lamination of the barrier film or foil to a bulk layer having pre-cut holes for openings or straw holes, perforations, creasing lines and the like. With a pre-coated foil or thin barrier, the cracks and defects around hole edges and creasing lines are decreased to a large extent, and thereby the oxygen gas barrier properties of packages formed from the laminated material are improved. Any such improvement is important in connection with packaging of liquid food for long-term aseptic storage. Since the thin barrier coating, film or foil is not laminated to the inside polymers until they have at least partially solidified, the risk of forming wrinkles and stress and strain there in are greatly reduced or even eliminated. Thus, melt solidifying wrinkles will not appear to negatively affect the quality of the barrier film or foil, since the solidifying takes place prior to laminating to the film or foil. And the smooth and improved pre-coated film or foil thus brings improved qualities to the final laminated material, in particular with regard to liquid packaging paperboard bulk layers, in which there are irregularities such as pre-cut holes or creasing lines.

According to a fourth aspect, a laminated packaging material that includes a film laminate described in the second aspect, is thus provided.

According to a fifth aspect, a laminated packaging material manufactured by the method described in the third aspect is thus provided.

According to a sixth aspect, a package manufactured from a laminated packaging material described in the fourth aspect or the fifth aspect is provided. According to a preferred embodiment, a package for liquid food is provided. Such packages have particularly high demands on integrity, i.e. ability to maintain tightness towards liquids, gases and bacteria to penetrate through the material, as well as on strength in transport handling and distribution from dairies/fillers to retailers. Packages manufactured by the methods and materials of the invention are thus improved in this respect.

According to a seventh aspect, an apparatus for providing a film laminate is provided.

The film laminate includes a substrate and a polymer film, and is suitable for forming a part of a laminated packaging material. The apparatus includes a polymer film extrusion casting unit configured to provide the polymer film by applying a molten polymer material onto a cooling roller. Further, the apparatus includes a substrate supply. Furthermore, the apparatus includes a lamination nip that is configured to apply pressure on the polymer film and a web of the substrate such that the web of the substrate is directly laminated to the polymer film, when arranged adjacent to each other in the lamination nip. The lamination nip is arranged in close proximity to the film casting unit, i.e. sufficiently close for the cast film to not have cooled down to surrounding room temperature. The cast film should be freshly produced without any intermediate winding up onto a reel and there should be no intermediate storage or further cooling after the casting operation. On the other hand, the cast film should have at least partly solidified before being joined to the web of the substrate in the lamination nip. Therefore, lamination according to the present invention is different from melt extrusion coating operations, in which the polymer film is applied in molten form onto the substrate and only allowed to cool during or after passing the lamination nip. According to a further embodiment, the lamination nip is further configured to apply heat on the web of the substrate and the polymer film.

Such application of heat into the nip, is normally achieved by one of the rollers in the nip being heated, directly or indirectly, to a suitable temperature.

In a further embodiment the web of the substrate may instead, or in addition, first be preheated by a heating device. Such a pre-heating device would be located somewhere between the supply of substrate film or foil and the lamination nip, most advantageously rather close to the lamination nip, for keeping the temperature of the substrate high, until it reaches the nip.

The pre-heating heating device, may for example be a heating box, a heating chamber or a heating roller, and may apply heat to the substrate in order to pre-heat it to lamination temperature before reaching the nip, by means of conduction, induction, infrared radiation or other heat transfer technology.

The resulting un-covered surface of the film laminate obtained, i.e. the uncovered surface of the extrusion cast film, will have the same topography and texture as any other extrusion coated polymer layer, in contrast to the surface of a pre-manufactured film, such as a film made by a film blow-moulding process. This is advantageous for a subsequent use of the laminated packaging material in a heat sealable packaging material for liquid food packaging, i.e. it has the right properties for subsequent sterilisation as well as for heat sealing, and other operations in a filling machine, such as friction properties, liquid adsorption properties, melt behaviour etc, as has previously been optimised with the conventional prior art lamination method. According to an embodiment, the innermost, heat sealable, layer has a thickness from 15 to 50 μm, such as from 18 to 40 μm, such as from 20 to 35 μm, while an adjacent, adhesive layer towards the barrier film or barrier metal foil, has a thickness from 3 to 10 μm, such as from 4 to 8 μm, such as from 5-7 μm.

BRIEF DESCRIPTION OF DRAWINGS

These and other aspects, features and advantages the invention is capable, will be apparent and elucidated from the following description of embodiments of the present invention, reference being made to the accompanying drawings, in which.

DETAILED DESCRIPTION

Returning to FIG. 1, the as such well known layer structure of a packaging laminate 10 is shown in FIG. 1, however, without any defects around sensitive areas such as holes, attenuations, creases and the like (not shown). The bulk layer, or core layer, 11 of a bulky, stability-providing material is covered by a layer 12 of a thermoplastic polymer, such as low-density polyethylene (LDPE), for forming an outside of the packaging laminate 10, i.e. a side of a final package that is not in contact with the enclosed product, usually a liquid food product, such as milk, dairy, beverage, juices, puree, etc. The bulk layer may e.g. be carton, paper, paperboard, cardboard, foam, or any other cellulose-based layer suitable for forming a bulk or core layer of a laminated packaging material. The outer layer 12 is intended to protect the bulk layer towards liquids and dirt, as well as to provide heat sealability properties in a subsequent filling and packaging process. An inner side of the core layer 11 is covered with a similar layer 13 of a thermoplastic polymer, such as conventionally LDPE (hereafter referred to as 'LDPE bonding layer 13') which is used to laminate, i.e. bind together, a thin, sensitive, layer comprising a gas barrier material, such as for example a thin foil of aluminium 14 (hereafter also referred to as 'aluminium foil 14') to the bulk layer 11. In order to avoid contact between the enclosed product and the barrier material or the aluminium foil 14, the aluminium foil is covered by a polymer layer, normally first an adhesive thermoplastic polymer layer 15 (hereafter also referred to as 'layer 15' or 'inner layer 15'). The adhesive polymer layer 15 is in turn covered by an innermost layer 16 of LDPE or a blend of LDPE with an linear low density polyethylene (LLDPE), such as an LLDPE polymerised in the presence of a constrained geometry catalyst, such as a metallocene-catalyst (m-LLDPE) (hereafter also referred to as 'layer 16' or 'inner layer 16'), which is to be in direct contact with the enclosed product in a packaging container formed from the laminated packaging material. The inner most layer 16 has a thickness from 15 to 50 µm, such as from 18 to 40 µm, such as from 20 to 35 µm, white the inner, adhesive layer 15, has a thickness from 3 to 10 µm, such as from 4 to 8 µm, such as from 5-7 µm.

Figure 2:
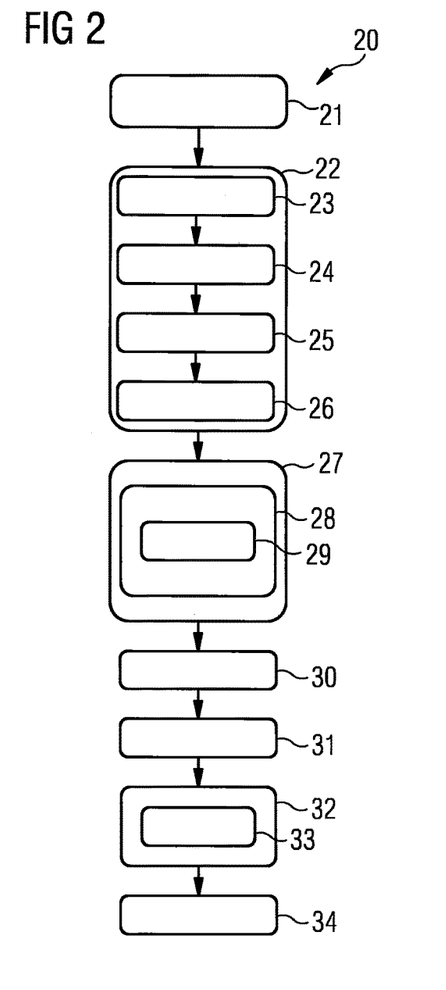
FIG. 2 is a schematic view of a method according to an embodiment.

Continuing with FIG. 2, a method 20 according to various embodiments is schematically illustrated. The method 20 is capable of providing a film laminate that comprises a substrate and a polymer film. The film laminate may form part of a laminated packaging material, such as a packaging material having a bulk layer and which is suitable for forming packages for liquid food products. The method 20 comprises a first step 21 of forwarding a web of the substrate to pass through a lamination nip formed between two adjacent rollers. Examples of the substrate include a metal foil preferably aluminium foil, a barrier polymer, a metallised film, and the like.

The method 20 further includes a step 22 of casting the polymer film by applying a molten polymer material onto a cooling roller to at least partially solidify the molten polymer material. The step 22 includes a sub-step 23 in which polymer material (normally in the form of granules) is molten and blended or processed in an extruder by a rotating screw while heating, and a sub-step 24 in which the molten polymer material is extruded onto the cooling roller, either as a single layer of polymer material, or as a multi-layered film structure of polymer material. The multi-layered polymer material may include an adhesive layer that can help adhere and laminate the polymer film to other layers of the laminated packaging material to be created, in particular to a substrate foil or film. Further to this, step 22 also includes a step 25 of operating a cooling roller, wherein an outer surface of the cooling roller is used to cool, and solidify or partially solidify the molten polymer material to form the polymer film while the cooling roller is moving and stretching the molten polymer film in a direction of roller movement. In addition, the step 22 also may include a step 26 of maintaining contact between the molten polymer film and the cooling roller for at least a predefined time period to form the polymer film. The step 26 may be carried out by letting a vacuum box or the like act from behind of the molten polymer curtain, such that it is kept closer and tight to the surface of the cooling roller as long time as possible. The predefined time period is the amount of time required for the molten polymer material to solidify at least partially. The predefined time may vary based on cooling properties of the molten polymer material. The molten polymer material may solidify on a side that is in contact with the cooling roller, leaving the opposite side in a molten state. Alternatively, both sides of the molten polymer material may solidify in the predefined time. In an embodiment, the molten polymer film may comprise a polyolefin homo- or copolymer material.

The method 20 further comprises a step 27 of directly forwarding the solidified or partially-solidified polymer film to pass through the lamination nip. The polymer film and the web of the substrate are arranged adjacent to each other in the lamination nip, thereby laminating the polymer film onto the web of the substrate to provide the film laminate. A side of the polymer film that is not in direct contact with a surface of the cooling roller comes in contact with the web of the substrate in the lamination nip. The step 27 may include a sub-step 28 of heating the web of the substrate to enable lamination with the polymer film. The sub-step 26 may include a further sub-step 29 of increasing the temperature at the lamination nip in order to heat the web of the substrate. The temperature at the lamination nip may be increased through an external source of heat that projects heat on the substrate web provided at the lamination nip, or a through a heat source located within one of the rollers forming the lamination nip. The heat source may be located within the roller that is in direct contact with the substrate web. The said roller may be a heated roller, or a so-called hot cylinder. Alternatively, the substrate web may be heated before it arrives at the lamination nip. When heated, the substrate web may melt a layer of the polymer film when the two come in contact at the lamination nip. The pressure applied at the lamination nip enables adhesion between the polymer film and the substrate web. It will be apparent that the substrate web may need to be heated up to a temperature that enables the adhesion.

Step 27 thus results in a film laminate, which according to FIG. 1 may correspond to the layers 14, 15, and 16.

In a package formed using a laminated packaging material that includes one of the film laminate embodiments described above, the polymer film of the film laminate is closer to the food product than the substrate. In other words, the polymer film forms the inner side of the package. The polymer film thus needs to be sealable in order to allow heat sealing of two adjacent portions of a laminated packaging material. The polymer film also needs to be liquid-tight for ensuring stiffness and rigidity of a bulk layer of the laminated packaging material.

Hence, an innermost layer of the laminated packaging material is a heat-sealable layer. An example of a heat-sealable layer is a heat-sealable polyolefin polymer which is applied as a layer to be directed towards the inside of the package, i.e. in direct contact with the food product. The innermost layer may suitably be a heat-sealable polymer such as a polyethylene (PE) polymer of the low density type, selected from the group consisting of LDPE, linear LDPE (LLDPE), Very Low Density PE (VLDPE), Ultra Low Density PE (ULDPE) metallocene catalyst manufactured LLDPE (mLLDPE) and blends of two or more thereof. Depending on the type of packaging containers produced from the laminated packaging material, heat-sealable innermost layers of high density polyethylene (HDPE), polypropylene (PP) or propylene co- or ter-polymers are also conceivable, as long as they are compatible with and achieve the desired effect in combination with other components of the laminated packaging material.

Suitable examples to be used as innermost layers are blends between LDPE and mLLDPE (e.g. 50/50, 40/50, 60/40, 30/70, 70/30, 20/80, 80/20, 10/90 m 90/10, 0/100, 100/0 weight % blend ratios), such as LDPE of extrusion grade, for example having a melt flow index (as determined in accordance with ASTM D1238, 190° C./2.16 kg) of 2-20, such as 2-12, such as 2-7, such as 2-6 and a density (as determined in accordance with ISO 1183, method D) of 914-922 kg/m3, such as 915-920 kg/m3. Examples of mLLDPEs suitable for use in aspects and embodiments described herein have a density less than 0.922 kg/cm3 and a melt flow index (MFI) of 15-25 at 190° C. and 2.16 kg (ASTM 1278). A thickness of the innermost layer of the laminated packaging material is for example between 5 µm-50 µm, such as 10 µm-30 µm, such as 15 µm-25 µm, such as 17 µm-25 µm.

The substrate, preferably a barrier film or a metal foil, such as an oxygen barrier film is pre-supported by the polymer film resulting from step 22. In some embodiments the barrier substrate is a polymer film, such as for example polyimide (nylon) or polyethylene vinyl alcohol (EVOH) film, having inherent barrier properties. In other embodiments the barrier substrate is a foil of aluminium or metal. A preferable thickness of an aluminium foil or any other metal foil is from about 5 to about 10 µm. In yet another embodiment, the barrier film is a multi-layered polymer film containing filler materials, such as inorganic laminar particles, arranged in lamellar structure within in a polymer material layer, thus providing barrier properties.

In further embodiments, a barrier substrate may be provided by vapour deposition coating a polymer film, such as a polymer film, such as oriented polyester or polyolefin film, with a thin inorganic or organic barrier coating, by a suitable chemical or physical vapour deposition method. The barrier coating may e.g. be applied by means of physical vapour deposition (PVD) or chemical vapour deposition (CVD), in particular plasma enhanced chemical vapour deposition (PECVD) onto the polymer film. A coating may also be added to a film substrate in order to provide aesthetic effects, such as for example for film laminates including a metallised and/or printed film, which is to be laminated to the outside of a packaging material, in order to provide a decorative outside of packages made from the laminated packaging material.

In some cases, such a vapour deposition coating or barrier coating having barrier properties is made of a metal compound, such as aluminium oxides, or an inorganic metal compound, e.g. silicon oxides. There are also organic vapour deposited barrier coatings, such as carbon-based vapour deposition coatings, which may be advantageous for laminated packaging materials.

The vapour deposition coating may consist substantially of aluminium metal. Such a metallic vapour deposited coating preferably has a thickness of from 5 to 50 nm, more preferably from 5-30 nm, which corresponds to less than 1% of the aluminium metal material present in an aluminium foil of conventional thickness, i.e. 6.3 µm.

A further preferable coating is a coating of aluminium oxide having the formula AlOx wherein x varies from 1.0 to 1.5, preferably of Al2O3. Preferably, the thickness of such a coating is from 5 to 300 nm, more preferably from 5 to 100 nm and most preferably from 5 to 50 nm. Normally, an aluminium metallised layer inherently has a thin surface portion consisting of an aluminium oxide due to the nature of the metallisation coating process used.

Alternatively, the substrate, may be formed by liquid film coating of an aqueous solution or dispersion, formed from a composition mainly comprising a polymer selected from the group consisting of polyvinyl alcohol (PVOH), water dispersible ethylene vinyl alcohol (EVOH), water dispersible polyamide (PA), acrylic or methacrylic acid polymers (PAA, PMAA) or ethylene (meth)acrylic co-polymers (E(M)AA), polyvinylidene chloride (PVDC), water dispersible polyesters, polysaccharides, polysaccharide derivatives such as cellulose and cellulose derivatives, starch and starch derivatives, and combinations of two or more thereof.

Again returning to the method 20, and FIG. 2, additional steps may be performed for allowing the method 20 to provide a laminated packaging material which comprises the bulk layer. Hence the method 20 further comprises a step 30 of providing or forwarding the film laminate as described in any one of the above embodiments. The method 20 further comprises a step 31 of forwarding a web of the film laminate as well as a web of the bulk layer to a lamination nip formed between two adjacent rollers. The method 20 may further comprise a step 32 of joining the web of the film laminate to the web of the bulk layer in the lamination nip by extruding a molten film of a thermoplastic polymer into the lamination nip between said webs such that the laminated packaging material is formed. In an embodiment, the step 32 may include a sub-step 33 of heating the web of the bulk layer and the web of the film laminate before joining the said webs. Pressure may also be applied at the lamination nip to join the two webs. It will be apparent that the said webs are arranged adjacent to each other in the lamination nip, and brought in touch by the lamination nip.

The method 20 may further comprise a step 34 of providing a further layer of thermoplastic polymer to the bulk layer such that the thermoplastic polymer layer covers one side of the bulk layer, and the opposite side of the bulk layer is covered by the film laminate. The step 34 may be carried out before or after the other lamination steps 30-32.

The thermoplastic polymer layer covering the bulk layer from the opposite side of the film laminate forms the outer layer of the package created from the laminated packaging material. This outer layer therefore needs to have liquid barrier properties to ensure that the bulk layer can maintain its integrity and strength. The outer layer should also be compatible with, and have adhesion to, a printed decor and other decorative features, on the surface of the bulk layer.

Now turning to FIGS. 3-5 different embodiments of a lamination line or system for providing a film laminate being suitable for forming a part of a laminated packaging material will be described.

Figure 3:
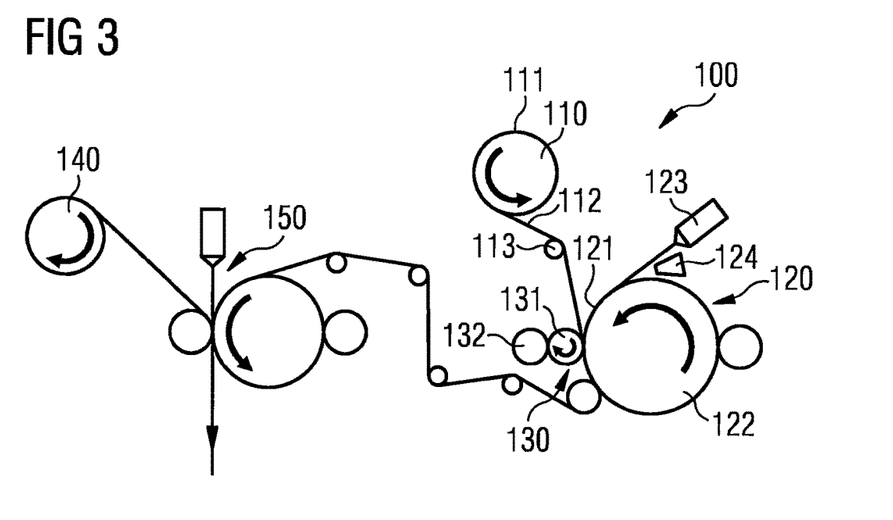
FIG. 3 is a functional view of a lamination system according to an embodiment.

Starting with FIG. 3 an apparatus 100 comprises three main parts, namely a substrate supply 110, a casting unit 120, and a lamination nip 130. As can be seen in FIG. 3, the apparatus 100 forms part of a larger lamination system, including a supply 140 of bulk layer, and a second lamination nip 150 for laminating the film laminate to the bulk material to form the laminated packaging material.

The casting unit 120 is configured to provide the polymer film 121 by applying molten polymer material onto a cooling roller 122. The cooling roller 122 is connected to a cooling device (not shown) for keeping the temperature of the outer surface at a predetermined level, and a driving means (not shown) for rotating the cooling roller 122. The casting unit 120 further comprises an extrusion die 123 arranged adjacent to the cooling roller 122 and configured to define the shape and dimensions of the molten polymer material. The extrusion die 123 may feed the polymer melt curtain onto the cooling roller at an angle, close to horizontally, in order for the melt curtain to come as close as possible to the cooling roller. According to another embodiment, the extrusion die may feed the polymer curtain onto the cooling roller more or less vertically, i.e. such that the melt curtain hits the cooling roller at a substantially perpendicular angle. A vacuum holder 124 may be provided for ensuring that the molten polymer material is applied onto, and contacting, the cooling roller 122 surface, as early as possible. A method of keeping the molten polymer material as close as possible to the cooling roller, by vacuum applied from behind the polymer melt curtain, is suitable for the casting of films having a thickness of below 50 μm. In cases when the cast film applied onto the cooling roller has a thickness of 50 μm or more, a technology involving an air knife, i.e. blow of air, acting on the polymer melt curtain from the front side, or from above, is more suitable. Cast film thicknesses below 50 μm are believed to be sufficient and adequate for the purpose of this invention.

The casting unit 120 may also comprise a supply of polymer (not shown) for allowing the extrusion die 123 to receive a constant supply of polymer material. Further to this, additional extruders and multilayer dies (not shown) may be provided for allowing the co-extrusion of a multi-layered polymer film. With reference to FIG. 1, a multi-layer die embodiment may be capable of providing a polymer film corresponding to layers 15, and 16.

The barrier substrate supply 110, preferably a barrier foil or a barrier film supply, includes a roll 111, onto which a web of substrate 112 is reeled. As already mentioned the substrate 112 may comprise a metal foil, a polymer film with specific barrier properties; either intrinsic or added by means of a coating or treatment. One or more additional guiding rollers 113 may also be provided for aligning the web of the substrate 112 with the lamination nip 130.

The lamination nip 130 is configured to apply pressure on the polymer film 121 and on the web of the substrate 112, such that the said webs are laminated to each other when arranged adjacent to each other in the lamination nip 130. In an embodiment, the lamination nip 130 may be further configured to apply heat on the two webs. In a further embodiment the web of the substrate 112 may instead, or in addition, be preheated by a heating device (not shown, but would be located somewhere between the substrate supply 110 and the lamination nip 130, most advantageously for keeping the temperature, rather close to the lamination nip 130). The resulting un-covered surface of the film laminate 112-121 obtained, i.e. the uncovered surface of film 121, will have the same topography and texture as any other extrusion coated polymer layer, in contrast to the surface of a pre-manufactured film, such as a film made by a film blow-moulding process or a film-stretching process. This is advantageous for a subsequent use of the laminated packaging material in a heat sealable packaging material for liquid food packaging, i.e. it has the right properties for subsequent sterilisation as well as for heat sealing, and other operations in a filling machine, such as friction properties, liquid adsorption properties, melt behaviour etc.

As is shown in FIG. 3, the lamination nip 130 is formed from a nip or press roller 131 which is arranged in close proximity with the cooling roller 122 of the casting unit 120. The substrate 112 as well as the coded down polymer film 121 is fed through the lamination nip 30. In a preferred embodiment, the roller 131 may be a heating roller. Due to the increased temperature the heating roller 131, the substrate 112 will be heated up and cause the polymer film 121 to melt and thus adhere to the substrate 112 in the lamination nip 130, thereby achieving appropriate lamination. On the other side of the press roller, is a back-up roller 132. The heating roller 131 may provide heat through any one of induction heating, conduction heating or infra-red heating techniques. In a preferred embodiment, temperature range of the heating roller 131 should be from about 100 to 200 degrees Celsius to heat the web of the substrate, thus enabling an appropriate adhesion with the polymer film 121. Alternatively, or additionally, a heating device, such as a heating box, a heating chamber or a heating roller, may apply heat to the substrate 112 by means of conduction, induction, infrared radiation or other heat transfer technology, in order to pre-heat it to lamination temperature before reaching the nip 130.

In an alternative embodiment, the roller 131 is a conventional nip roller or press roller, while the roller 132 is a heating roller, for indirectly heating the substrate 112 via the surface only, of the press roller 131.

After passing through the lamination nip 130 the film laminate, i.e. the laminate of the film and the substrate or foil, is guided to the second lamination unit 150 at which the film laminate is laminated to the bulk layer. The second lamination unit 150 is a main heat source, which may further bring the polymer film 121 and the substrate 112 to reach full adhesion to each other. The lamination nip 130, however, enables adequate adhesion for the film laminate to be formed, and to be free from air inclusions.

The use of a casting unit 120 provides a number of benefits compared to the traditional way of extrusion coating; the extrusion temperature of the polymer film may be decreased, and shrinkage and wrinkles of the barrier foil may be avoided.

Figure 4:
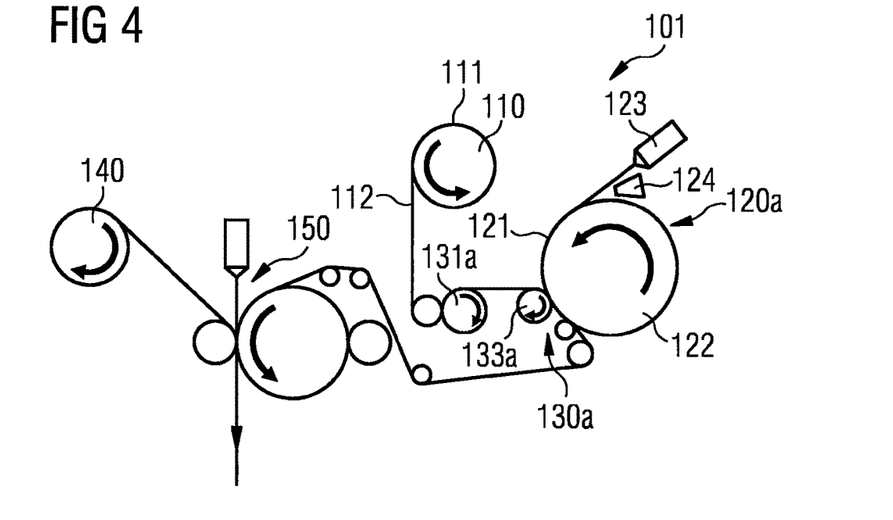
FIG. 4 is a functional view of a lamination system according to another embodiment.

FIG. 4 shows a further embodiment of an apparatus 101 for providing a film laminate and a laminated packaging material. The casting unit 120*a* and the substrate supply 110 are identical with the embodiment shown in FIG. 3, why they will not be described again. However the apparatus 101 comprises a lamination unit 130*a* and a pre-heating roller 131*a* which is arranged at a distance from the cooling roller 122 of the casting unit 120*a*. Therefore an additional set of guiding rollers 133*a* are provided, wherein at least one of said guiding rollers 133*a* is arranged in close proximity with the cooling roller 122 of the casting unit 120*a* in order to form a lamination nip through which the substrate 112 and the polymer film 121 is fed. The guiding roller 133*a* then has the function of a nip roller or press roller. Such embodiment may be preferred in order to avoid excessive heating of the cooling roller 122.

Figure 5:
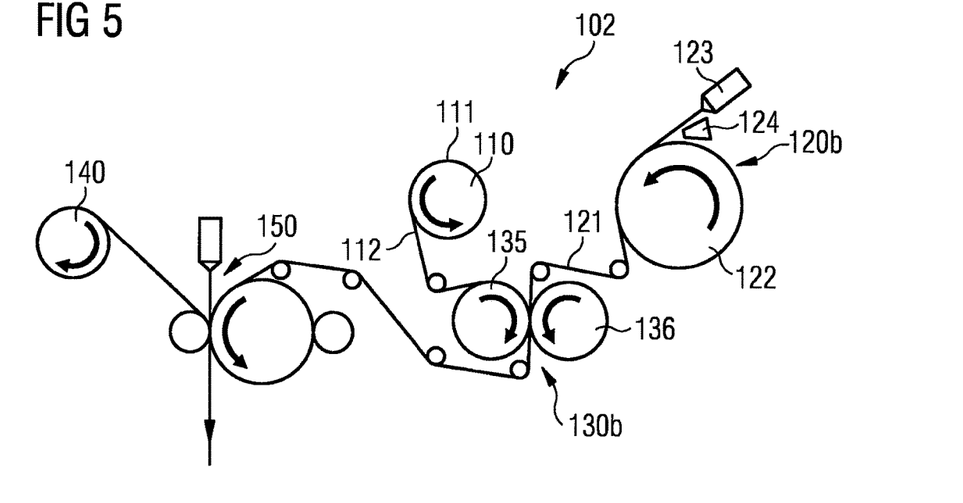
FIG. 5 is a functional view of a lamination system according to a further embodiment.

FIG. 5 shows a yet further embodiment of an apparatus 102 for providing a film laminate to form a laminated packaging material, and laminating the film laminate to a bulk layer. What differs in FIG. 5 compared to the embodiments of FIGS. 3 and 4, is that the polymer film 121 and the substrate 112, preferably aluminium foil, are fed through a separate nip formed between a heating roll 135 and an anvil roller 136 of a lamination unit 130*b*. The heating roller 135 is a conduction heating roller that draws heat from a heating element (not shown), such as heated oil, steam, and the like. In another embodiment, the heating roller 135 is an induction heated roller, a so-called hot cylinder. In such a roller, the heat is generated by induction in the metal surface of the roller.

Although the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method comprising:
producing a film laminate, comprised of a substrate and a polymer film, to form part of a laminated packaging material, the producing of the film laminate comprising:
    forwarding a web of the substrate to pass through a lamination nip;
    casting the polymer film by applying a molten polymer material onto a cooling roller at a first location on the cooling roller to at least partially solidify the molten polymer material on the cooling roller;
    rotating the cooling roller for a predetermined time so that the polymer material at the first location rotates towards the lamination nip, thus forming the polymer film to produce a formed polymer film in a first step; and
    after the rotating of the cooling roller for the predetermined time to form the polymer film, subsequently and directly forwarding the formed polymer film to pass through the lamination nip, thereby laminating the formed polymer film onto the web of the substrate to provide the film laminate.

2. The method according to claim 1, wherein the casting of the polymer film is performed by an extrusion casting process onto the cooling roller, the lamination nip being defined by a press roller and an anvil roller, the anvil roller being a different roller spaced from the cooling roller.

3. The method according to claim 1, wherein the substrate comprises a metal foil.

4. The method according to claim 1 further comprising heating the web of the substrate to enable lamination with the polymer film.

5. The method according to claim 1, wherein the applying of the molten polymer film comprises maintaining contact between the molten polymer film and the cooling roller until the temperature of the molten polymer material has at least partially decreased to its melting point or lower, in order to form the polymer film, prior to laminating the polymer film to the web of the substrate.

6. The method according to claim 1, further comprising:
    forwarding a web of the film laminate and a web of a bulk layer to a second lamination nip; and
    joining the web of the bulk layer to the web of the film laminate in the second lamination nip by extruding a molten film of a thermoplastic polymer and laminating the molten film between the web of the bulk layer and the web of the film laminate in the lamination nip, thereby forming a laminated packaging material.

7. The method according to claim 6, further comprising providing a further layer of thermoplastic polymer to the bulk layer such that the thermoplastic polymer layer covers one side of the bulk layer, and an opposite side of the bulk layer is covered by the film laminate.

8. The method according to claim 1, wherein the substrate is aluminum foil.

9. A method for producing a film laminate specifically configured to form part of a laminated packaging material, the film laminate comprising a substrate and a polymer film, the method comprising:
    forwarding a web of the substrate to pass through a lamination nip;
    casting the polymer film by applying a molten polymer material onto a cooling roller to solidify the molten polymer material on the cooling roller, thus forming the polymer film on the cooling roller; and
    after the solidifying of the molten polymer material to form the polymer film on the cooling roller, subsequently and directly forwarding the formed polymer film to pass through the lamination nip while the web of the substrate is passing through the lamination nip, thereby laminating the formed polymer film onto the web of the substrate to produce the film laminate.

* * * * *